(12) United States Patent
Cox et al.

(10) Patent No.: US 6,182,187 B1
(45) Date of Patent: Jan. 30, 2001

(54) SYSTEM ROM INCLUDING A FLASH EPROM AND A ROM FOR STORING PRIMARY BOOT CODE REPLACING A BLOCK FLASH EPROM

(75) Inventors: B. Tod Cox, Houston; Peter J. Michels, Cypress; Michael R. Kluth, Tomball, all of TX (US); Jeffrey S. Watters, Beaverton, OR (US)

(73) Assignee: Compaq Computer Corporation, Houston, TX (US)

( * ) Notice: Under 35 U.S.C. 154(b), the term of this patent shall be extended for 0 days.

(21) Appl. No.: 08/044,241

(22) Filed: Apr. 7, 1993

(51) Int. Cl.[7] .................................................. G06F 12/00
(52) U.S. Cl. ................................................................ 711/5
(58) Field of Search ................................... 395/650, 700, 395/800, 425; 380/20; 711/5

(56) References Cited

U.S. PATENT DOCUMENTS

| | | | |
|---|---|---|---|
| 5,019,970 | * 5/1991 | Yamaguchi et al. | 711/115 |
| 5,195,130 | * 3/1993 | Weiss et al. | 379/93.19 |
| 5,303,171 | * 4/1994 | Belt et al. | 713/321 |
| 5,321,840 | * 6/1994 | Ahlin et al. | 711/11 |
| 5,327,531 | * 7/1994 | Bealkowski | 714/6 |
| 5,355,489 | * 10/1994 | Bealkowski et al. | 713/2 |
| 5,388,267 | * 2/1995 | Chan et al. | 713/2 |
| 5,440,632 | * 8/1995 | Bacon et al. | 380/20 |
| 5,471,674 | * 11/1995 | Stewart et al. | 713/2 |

OTHER PUBLICATIONS

28F010 1024K (128K x 8) CMOS Flash Memory, Intel Memory Products Data Book, 1993, pp. 3–54—3–83.
28F001BX–T/28F001BX–B 1M (128K x 8) CMOS Flash Memory, Intel Memory Products Data Book, 1983, pp. 3–117—3–145.
Toshiba MOS Memory Products, TC541000P/F–20, –25, TC541001P/F–20,—25, Toshiba MOS Memory Products Data Book, 2/89, pp. K–59—K–71.
Axelson, Jan, "How to use Flash EPROMS," Computercraft Mar. 1993, pp. 32–39.*
(No author given) MC68000 Educational Computer Board User's Manuel, Second edition, pub. Motorola, Inc, Jul. 1982.*
Axelson, Jan, "How to use Flash EPROMS," Computer Craft Mar. 1993, pp. 32–39.*

* cited by examiner

*Primary Examiner*—Alvin E. Oberley
*Assistant Examiner*—St. John Courtenay, III
(74) *Attorney, Agent, or Firm*—Akin, Gump, Strauss, Hauer & Feld, LLP

(57) ABSTRACT

A computer system having a system ROM comprising a flash or bulk EPROM replacing a block flash or boot block EPROM, and a second ROM to store the primary boot code. In a first embodiment, a single block EPROM is replaced with a bulk EPROM and a ROM, where the ROM is preferably a one-time programmable ROM. The primary boot code is copied into the ROM thereby preventing its erasure. The bulk EPROM is reprogrammed if desired. Separate decode logic detects an address to the primary boot code and enables the ROM. In a second system using a block EPROM and a bulk EPROM as the system ROM, the block EPROM is replaced with a bulk EPROM, and the primary boot code is copied into both bulk EPROMs, preferably at mirrored locations. An external switch is provided with appropriate logic, so that the user may select between either of the bulk EPROMs to boot the system. Thus, if the system is unable to boot from one of the bulk EPROMs, the user may flip the switch to access the primary boot code from the other bulk EPROM. A software program is executed after successful reboot to reprogram and verify the contents of both of the bulk EPROMs. The software reprograms and verifies one bulk EPROM and then reprograms and verifies the other to assure data integrity.

8 Claims, 4 Drawing Sheets

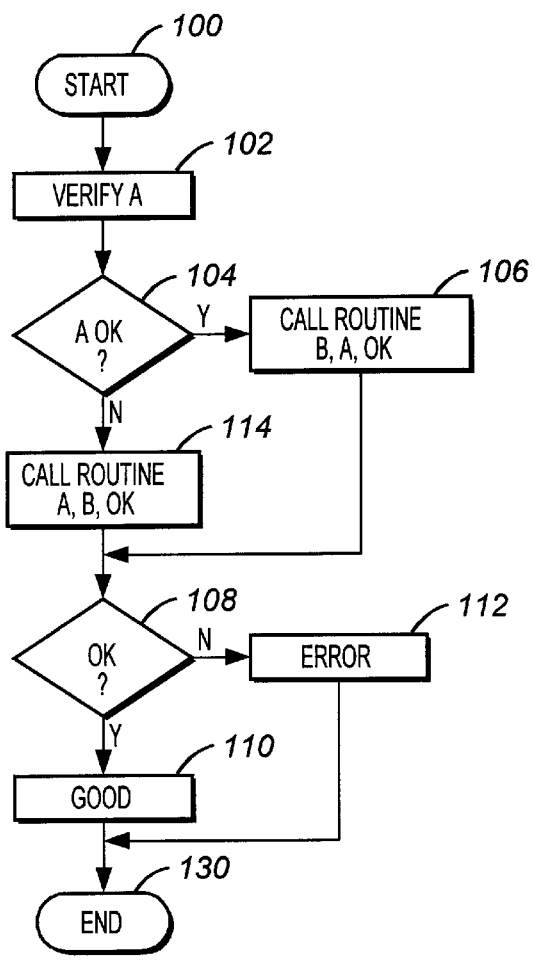
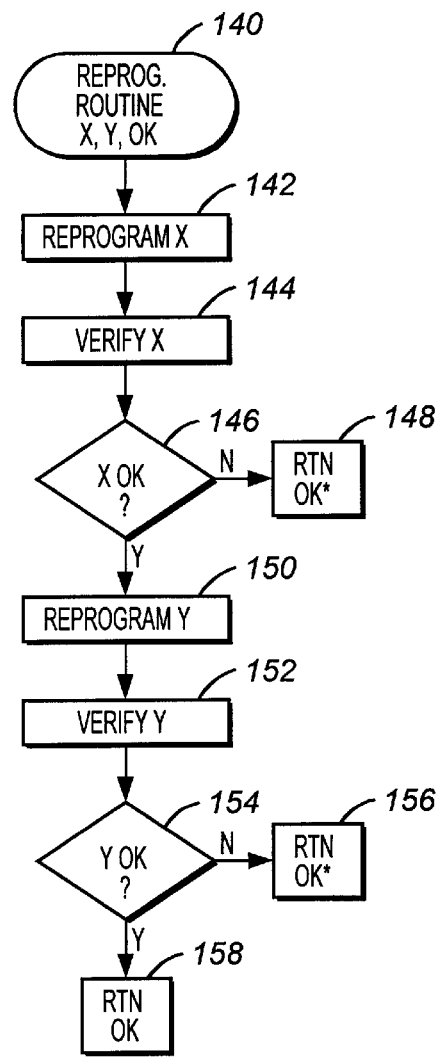
FIG. 6A
FIG. 6B

SYSTEM ROM INCLUDING A FLASH EPROM AND A ROM FOR STORING PRIMARY BOOT CODE REPLACING A BLOCK FLASH EPROM

BACKGROUND OF THE INVENTION

1. Field of the Invention

The present invention relates to replacing a boot block flash EPROM used as a system ROM with a more conventional flash EPROM and a second ROM for storing primary boot code.

2. Description of the Related Art

A basic computer system typically includes a microprocessor, a memory system and input/output (I/O) devices. The I/O devices typically include a display, a keyboard or mouse and possibly other communication devices, and also storage devices including diskette or floppy drives and hard or fixed disk drives. The memory system may include a very fast cache used to store frequently accessed memory or data, relatively fast main memory comprising random access memory (RAM) for storing programs and instructions during operation of the computer system, and read only memory (ROM) for storing permanent information generally used on a regular basis, such as short programs and routines, tables of fixed data, and routines and data used for display of characters. ROMs are nonvolatile so that their data is permanent and remains valid while the computer system is powered off. Thus, ROMs are ideal for stored and coded information representing the sequence of internal control variables for initializing or enabling the various operations in the computer system upon power-up. One or more ROMs used for this purpose are generally referred to as the system ROM.

For example, in an IBM PC/AT or compatible computer system, a system ROM is used to store the basic input output system (BIOS) executed upon power up by the microprocessor for system initialization and for performing certain low level, hardware dependent operations. In particular, the system ROM stores routines executed by the microprocessor for initialization of the computer system, including routines for power on self tests (POST), interaction with the display, floppy and fixed disk drives, and routines to interface communication devices as well as peripheral devices. More sophisticated routines and data may be included in the system ROM depending upon the needs and complexity of a given computer system. However, a certain minimum amount of code in the system ROM is necessary to initialize a computer system and must not be lost. This minimum necessary code will be referred to as the primary boot code, which must at least initialize the microprocessor, at least one floppy disk drive, the video controller, the keyboard or mouse and establish access to the system ROM itself for reprogramming, if necessary.

The primary boot code is generally well defined and not subject to changes. Once the primary boot code is executed, the microprocessor executes some or all of the remaining code in the system ROM to complete the boot procedure. This remaining or secondary boot code is used for other I/O and peripheral devices and is generally subject to modifications. For example, errors and bugs requiring correction and new versions or new releases of the secondary boot code are common, so that portions of the system ROM for storing the secondary boot code should be reprogrammable. Otherwise, the entire system ROM must be replaced in the event of fixes, enhancements or upgrades.

Several types of ROMs are commercially available. A basic ROM, referred to as a masked ROM, has its code hardwired internally at the factory and thus can not be reprogrammed later. Masked ROMs have been used as system ROMs, but must be completely replaced if changes in the boot code are desired or necessary. Since enhancements and upgrades are common, masked ROMs are not preferred for use as system ROMs because of lead time and minimum quantity problems. Another type of ROM similar to the masked ROM is referred to as a one-time programmable (OTP) ROM. The OTP ROM is programmed once by the user or supplier of a computer system, but cannot be reprogrammed. OTP ROMs are better than masked ROMs for system ROM purposes since the computer manufacturer or supplier has control over the boot code programmed into the OTP ROMs and can provide upgraded ROMs more readily. Nonetheless, OTP ROMs are undesirable by themselves to comprise the system ROM since they are also not reprogrammable.

Several programmable ROMs are commercially available, generally referred to as erasable programmable ROMs (EPROMs), including ultra-violet (UV) EPROMs and electrically erasable programmable ROMs (EEPROMs). UV EPROMs or the like require external access to the ROMs to be erased, possibly even removal from the computer system, and thus are not convenient for reprogramming purposes. EEPROMs are not necessarily desirable for system ROM purposes since they are very expensive and are generally erasable only one byte at a time.

Flash EPROMs, otherwise referred to as "bulk" EPROMs, are nonvolatile, random access and reprogrammable memory devices. The entire data contents of bulk EPROMs are erased through a simple flash erase operation. Flash EPROMs typically include an input pin for erase purposes, where a high voltage, such as +12 volts, applied to the erase input pin enables erasure. An erase command completes the erase procedure. Bulk EPROMs are relatively inexpensive, but are still not preferred for use as system ROMs since the entire data contents are erased during an erase procedure, including the primary boot code, which should remain intact.

A popular ROM device presently used to comprise system ROMs is referred to as block flash or simply block EPROMs. Block EPROMs are essentially bulk EPROMs which are divided into multiple portions, which may be individually erasable, or may otherwise include a portion which is not erasable. Thus, one portion is used to store the primary boot code, where this portion is either non-erasable or the erase capability for that portion is not enabled.

One such block EPROM, referred to as the boot block EPROM, such as the 28F001 manufactured by Intel, is a 128 kbyte EPROM comprising two portions having separate erase enable inputs, including a separate 8 kbyte erasable portion and a separate 120 kbyte erasable portion. Typically, the 8 kbyte portion is used to store the primary boot code, where its flash erasable function is disabled (or non-enabled) to prevent accidental erasure. This may be achieved by not connecting the erase enable input pin for this portion. The remaining 120 kbyte portion can be erased by asserting the erase enable input pin and supplying the appropriate commands, and then reprogrammed through software. Thus, enhancements or upgrades to the secondary boot code can readily be made without the threat of erasure of the primary boot code.

The popularity of block EPROMs, including the boot block EPROM by Intel, has caused shipment delays and access problems. Vendors have simply been unable to meet the demand, so that computer suppliers are unable to complete computer systems otherwise ready for shipment. It is desirable, therefore, to find alternative methods of providing similar functions performed by block and boot block EPROMs.

SUMMARY OF THE PRESENT INVENTION

A computer system according to the present invention uses readily available bulk or flash EPROMs to replace the block or boot block flash EPROMs typically used for the system ROM purposes. In a first embodiment for simpler systems using a single block or boot EPROM, a first bulk EPROM and a second ROM are used instead of the block EPROM. The primary boot code is stored in the second ROM, which is preferably an OTP ROM. Separate decode logic is provided to enable the second ROM and disable the bulk EPROM when the microprocessor attempts to access the primary boot code during power-up. The secondary boot code is stored in the bulk EPROM, which is erasable and programmable for subsequent fixes, enhancements or upgrades.

In an alternative embodiment for more complicated systems having a system ROM comprising a first block EPROM and a second bulk EPROM, the block EPROM is replaced with a bulk EPROM. The primary boot code is duplicated in both bulk EPROMs, preferably at mirrored locations. Selection logic is coupled to the microprocessor for receiving address and control signals used to select one bulk EPROM or the other depending upon which portion of the boot code is being accessed. An external switch and supporting logic is used to reverse the selection logic and select the other bulk EPROM. This is used primarily to access the primary boot code of the other bulk EPROM if the primary bulk EPROM is malfunctioning. Thus, the switching means effectively swaps the normal selection process performed by the selection logic. If the system fails to boot-up, the system can be booted successfully by flipping the switch to access the primary boot code in the other bulk EPROM. In the case of ROM fixes, enhancements or upgrades, a software program is executed to verify and reprogram either or both of the system ROMs. The software is designed to and erase, reprogram and verify one of the EPROMs before commencing operations on the other to assure data integrity.

In this manner, it can be appreciated that readily available bulk EPROMs and ROMs are used to comprise the system ROM, thus replacing the block EPROMs. Dependency on block EPROMs is thereby avoided.

BRIEF DESCRIPTION OF THE DRAWINGS

A better understanding of the present invention can be obtained when the following detailed description of the preferred embodiment is considered in conjunction with the following drawings, in which:

FIGS. 6A and 6B are flowchart diagrams illustrating a software routine used to reprogram the bulk EPROMs of FIG. 4.

DETAILED DESCRIPTION OF THE PREFERRED EMBODIMENT

Figure 1:
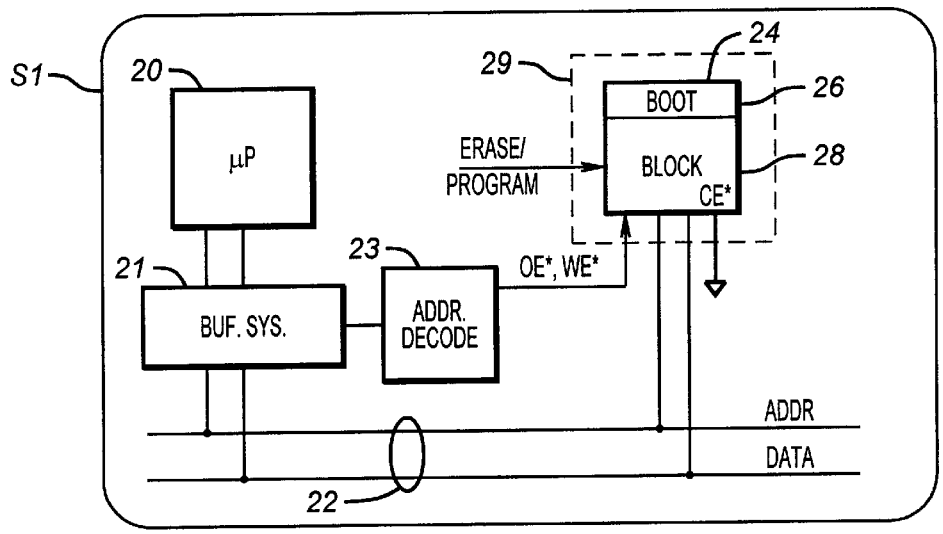
FIG. 1 is a simplified block diagram of a system board with a system ROM consisting of a single boot block EPROM.

Referring now to FIG. 1, a simplified block diagram is shown of a system board S1 including a single boot block EPROM 24 used to comprise a system ROM 29. A microprocessor 20 is shown, which is preferably the 80386, i486 or Pentium, all manufactured by Intel. The present invention is not limited, however, to any particular microprocessor or computer system. The microprocessor 20 is connected to a buffer system 21, which generally comprises a host bus, an I/O bus such as the Industry Standard Architecture (ISA) or the Extended ISA (EISA) bus system, as well as buffers, bus masters, controllers and drivers as known to those skilled in the art. Specific details of the buffer system 21 are omitted for purposes of clarity, and are not necessary for a full disclosure of the present invention. It is understood that the present invention is not limited to any particular configuration of bus schemes as many combinations are possible.

The buffer system 21 is connected to a bus 22 having address and data portions, which is generally returned to as the X bus in an IBM PC/AT or compatible computer system, as known to those skilled in the art. The system ROM 29 is preferably coupled to the bus 22, which preferably comprises 16 address and 8 data bits. Since the address bus of the computer system is preferably a 32- bits or more, address decode logic 23 is shown coupled to the buffer system 21 to determine when the microprocessor 20 asserts a cycle and an address to access the system ROM 29. The address decode logic 23 develops several signals to enable the block EPROM 24, including an output enable signal OE* and a write enable signal WE*. An asterisk at the end of a signal name denotes negative logic, where the signal is considered asserted when low. Thus, the address decode logic 23 receives the upper address bits of the microprocessor 20 and various other control signals for development of the OE* and WE* enable signals. The address decode logic 23 preferably comprises programmable logic devices (PLDs), such as PLAs or PALs as generally known to those skilled in the art, but could be integrated into an ASIC if desired. The block EPROM 24 is preferably always enabled having its chip enable input pin CE* grounded.

The block EPROM 24 is preferably the 28F001 128 kbyte boot block EPROM manufactured by Intel, although any other type of block flash ROM of the appropriate size could be used. Intel's boot block EPROM preferably comprises 128 kbytes, separated into two separate selectably erasable portions, where a first or primary boot portion 26 is preferably 8 kbytes and a secondary boot portion 28 is the remaining 120 kbytes, with the secondary boot portion 28 capable of being divided into further portions. The primary boot portion 26 contains primary boot code, which is the minimum code necessary for properly booting the microprocessor 20 upon power up of the computer system incorporating the system board S1. The primary boot code must at least initialize the microprocessor 20, at least one floppy disk drive, the video controller, the keyboard or mouse and establish access to the system ROM 29 itself for reprogramming, if necessary. The remaining or secondary boot portion 28 of the block EPROM 24 includes secondary boot code, which provides other permanent functional support such as initialization of other floppy and fixed disk drives, communication devices and peripheral devices, auxiliary input devices and password support, if necessary.

Upon power up of the computer system, the microprocessor 20 accesses the system ROM 29 and executes the primary boot code. The primary boot code also preferably includes code to detect data corruption within the secondary boot code. If no corruption has occurred, the microprocessor 20 executes some or all of the secondary boot code to complete the boot procedure. If data corruption has occurred in the secondary boot code, boot execution stops and the user is preferably warned. In this case, the user may insert a floppy disk into the floppy disk drive containing software to reprogram the secondary boot portion 28 with the secondary boot code to re-establish the system. A signal ERASE is asserted to the block EPROM 24, and usually an erase command is issued to the block EPROM 24, causing erasure of the secondary portion 28. The software then writes new data into the secondary boot portion 28 for replacement or upgrade purposes.

The primary boot code is generally not subject to bugs, fixes, upgrades or enhancements, so that it is typically located in the primary boot portion 26 of the block EPROM 24 where erasing capability is not used or is not enabled. Thus, the primary boot portion 26 remains intact even if the secondary boot portion 28 is erased.

Figure 2:
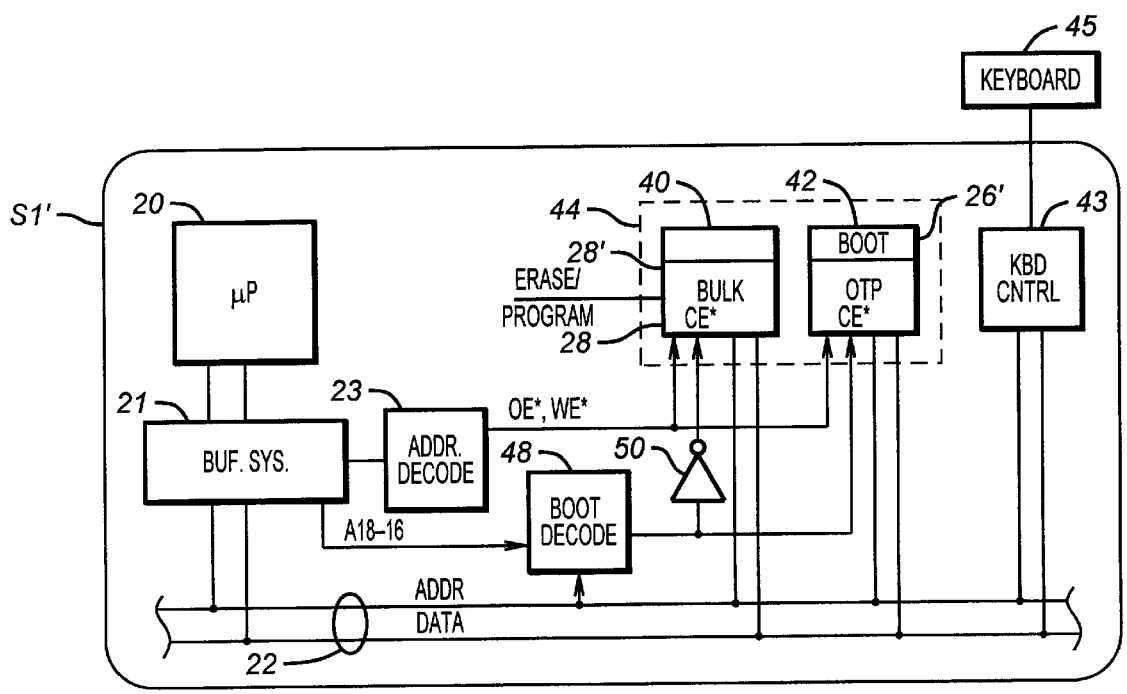
FIG. 2 is a simplified block diagram of a system according to the present invention where the boot block EPROM of FIG. 1 is replaced with a bulk EPROM and an OTP ROM.

Referring now to FIG. 2, a system board S1' is shown, which is implemented according to the present invention. The system board S1' directly replaces the system board S1 shown in FIG. 1. Again, the microprocessor 20 is shown coupled to the buffer system 22, which is connected to the bus 22. The address decode logic 23 is connected to the buffer system 21 and provides the OE* and WE* enable signals as described before. The system ROM 29 of FIG. 1 comprising the block EPROM 24 is replaced with a bulk EPROM 40 and a ROM 42, preferably an OTP ROM, both connected to the bus 22, to form a new system ROM 44 according to the present invention. A keyboard controller 43 is coupled to the bus 22, to receive initialization code, and a keyboard 45. It is noted that the OTP ROM 42 could be any other type of similarly-sized ROM or EPROM, as long as its erase capability, if available, is not enabled. An OTP ROM is preferable due to cost and convenience. The OTP ROM 42 is programmed to incorporate the primary boot code at a primary location 26' which is a corresponding location to the primary boot portion 26 in the block EPROM 24, whereas the bulk EPROM 40 preferably contains the secondary boot code at a secondary location 28', which is a corresponding location to the secondary boot location 28 in the block EPROM 24.

Boot logic 48 is coupled to upper address signals from the buffer system 21 and the address portion of the bus 22, and asserts an output signal low when the microprocessor 20 asserts a cycle to the primary boot code. The upper address bits are preferably the A18, A17 and A16 address bits, and the boot decode logic is preferably coupled to the XA15, XA14 and XA13 address bits from the bus 22. The boot decode logic 48 preferably comprises a NAND gate receiving the address bits at its input. The output of the boot decode logic 48 is connected to the input of an inverter 50 and also to the chip enable input of the OTP ROM 42. The output of the inverter 50 is connected to the chip enable input of the bulk EPROM 40.

In this manner, when the microprocessor 20 asserts an address to access the primary boot code, the boot logic 48 asserts its output low, thereby selecting the OTP ROM 42, and the inverter 50 asserts its output high, disabling the bulk EPROM 40. Through the operation of the decode logic 48 and the inverter 50, the microprocessor 20 accesses the primary boot code within the OTP ROM 42 when powered up, thereby bypassing the bulk EPROM 40. Since the OTP ROM 42 is not erasable, the primary boot code is protected from accidental erasure under normal conditions. Furthermore, the microprocessor 20 always has access to the primary boot code. The bulk EPROM 40 contains the secondary boot code, which otherwise resided in the block EPROM 24. On accesses to the secondary boot code, the boot decode logic 48 keeps its output high, so that the inverter 50 provides a low output to enable the bulk EPROM 40.

It can now be appreciated that the block EPROM 24 is no longer required since it is replaced with the bulk EPROM 40 and the OTP ROM 42. The primary boot code resides in the OTP ROM 42 thereby preventing its erasure. Any system bugs, fixes, upgrades or enhancements required to the secondary boot code is achieved through a software program preferably executed by the microprocessor 20, which first erases the entire contents of the bulk EPROM 40 by asserting the ERASE/PROGRAM signal, at the proper voltage, to the bulk EPROM 40 and providing the erase command, and then rewriting the contents of the bulk EPROM 40 with new code according to procedure required by the bulk EPROM 40, which typically involves providing the ERASE/PROGRAM signal and the proper data write sequence. It is also noted that the same basic board could be used for both system boards S1 and S1', where the system board S1 preferably includes an empty socket to receive the OTP ROM 40 and room for mounting the boot decode logic 48 and the inverter 50. This option is preferable for ease of manufacturing.

Figure 3:
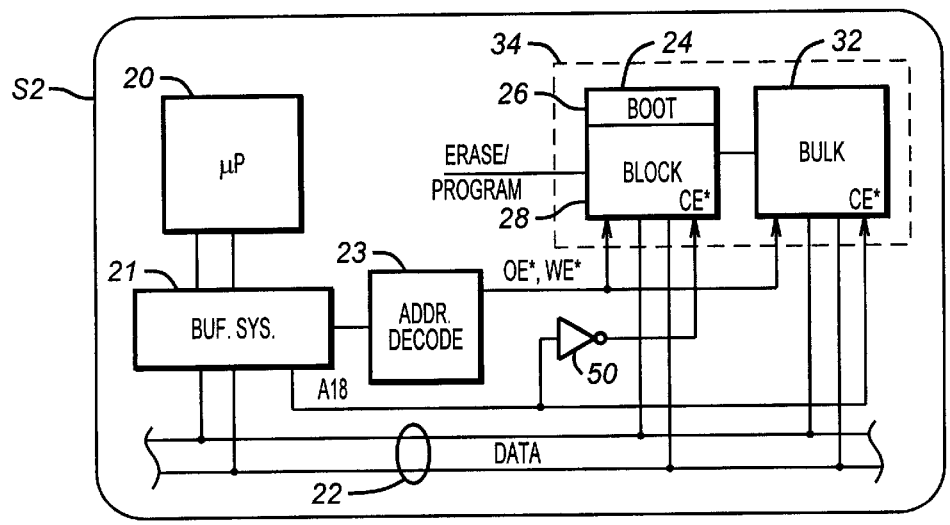
FIG. 3 is a simplified block diagram of a system board with a system ROM consisting of a boot block EPROM and a secondary bulk EPROM.

Referring now to FIG. 3, a simplified block diagram of a system board S2 is shown of a computer system having greater capabilities than the computer system using the system board S1 of FIG. 1. Again, the microprocessor 20, the buffer system 21 the address decode logic 23 and the bus 22 are shown connected in a similar manner. However, a flash EPROM or "bulk" ROM 32 is included as part of a more sophisticated system ROM 34. The bulk EPROM 32 is connected to the bus 22 in a similar manner as the block EPROM 24. Since there are two ROMS to access in the system ROM 34, the A18 address signal is a convenient signal from the buffer system 21, which is used to select between the primary block EPROM 24 and the secondary bulk EPROM 32. The A18 signal is connected to the chip enable input of the bulk EPROM 32 and to the input of the inverter 50. The output of the inverter 50 is connected, as before, to the chip enable input of the block EPROM 24.

The block EPROM 24 includes the primary boot code, which is the same as or very similar to the primary boot code of the system board S1 of FIG. 1, and is located at the primary boot portion 26. Also, the secondary boot code may be provided within the block EPROM 24 at the secondary boot portion 28, although this code may be somewhat different depending upon the computer system. The bulk EPROM 32 includes further supplementary code and data to support further capabilities on the system board S2 as compared to the system board S1. Thus, upon power up of the system board S2, the microprocessor 20 first executes the primary boot code, then executes the code in the secondary boot portion 28 and then any code provided within the bulk EPROM 32. The ERASE/PROGRAM signal is provided to erase the secondary boot portion 28 of the block EPROM 24 and the entire contents of the bulk EPROM 32 for fixes, upgrades and enhancement purposes. Two separate ERASE/PROGRAM signals could be used to separately erase corresponding portions of the EPROMs 24 and 32. As before, the microprocessor 20 preferably issues an erase command in conjunction with assertion of the ERASE/PROGRAM signal to complete the erasure process.

Figure 4:
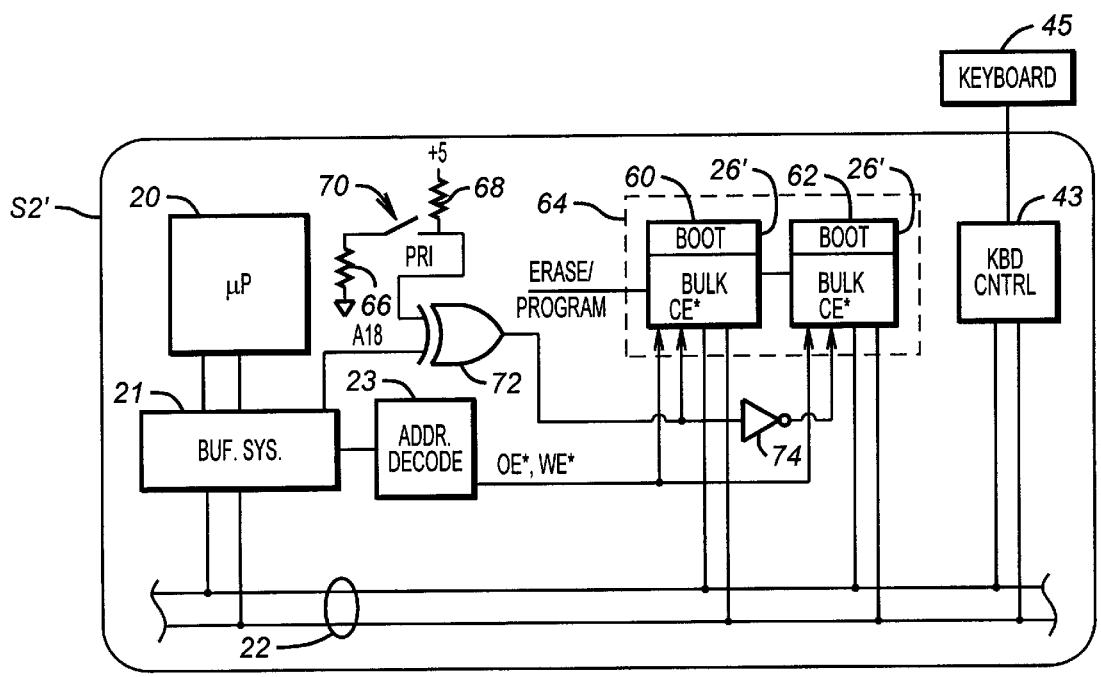
FIG. 4 is a simplified block diagram of a system board according to the present invention where the boot block EPROM of FIG. 3 is replaced with a bulk EPROM.

Referring now to FIG. 4, a system board S2' is shown, which is implemented according to an alternative embodiment of the present invention. Again, the microprocessor 20 is coupled to the buffer system 21, which is coupled to the address decode logic 23 and the bus 22. The address decode logic 23 provides the OE* and WE* enable signals. A keyboard controller 43 is coupled to the bus 22, to receive initialization code, and a keyboard 45. The system board S2' is similar to the system board S2 except that the block EPROM 24 is replaced with a flash or bulk EPROM 60. Also, extra logic, described below, is used to switch between the bulk EPROMs 60 and 62. It is further noted that the primary boot code is copied into primary portions 26' of both bulk EPROMs 60 and 62, preferably at mirrored locations. The ERASE/PROGRAM signal is provided to both bulk EPROMs 60 and 62 for erasing purposes, although two separate signals could be used. Again, since it is desirable to erase only one of the bulk EPROMs 60 or 62 at a time, an erase command is preferably issued to one of the EPROMs to complete the erase procedure. It is noted that the bulk EPROM 62 is implemented in a similar manner as the bulk EPROM 32, except that the primary boot code is copied in the bulk EPROM 62. Again, both bulk EPROMs 60 and 62 are coupled to the bus 22 in a similar manner.

A normally-open, single-pole switch 70 is provided externally for access by the user of the computer system. The first terminal of the switch 70 is connected through a pull-down resistor 66 to ground. The second terminal of the switch 70 is connected through a pull-up resistor 68 to +5 volts. The second terminal provides a signal PRI, which is provided to one input of a two-input XOR gate 72, which has its other input connected to the A18 address signal. The output of the XOR gate 72 is connected to the chip enable input of the bulk EPROM 60 and to the input of an inverter 74. The output of the inverter 74 is connected to the chip enable input of the bulk EPROM 62. The A18 signal is a convenient signal used to select between the bulk EPROMs 60 or 62. When the microprocessor 20 asserts an address to access the primary boot code, the A18 signal is asserted high. If the switch 70 is open, so that the PRI signal is pulled high, the microprocessor 20 selects either the bulk EPROM 60 or the bulk EPROM 62 depending upon the level of the address signal. However, if the switch 70 is closed by the user, the PRI signal is pulled low through the resistor 66, so that the XOR gate 72 reverses the selection operation of the A18 signal. The microprocessor 20 normally accesses the primary boot code residing in the bulk EPROM 60 when the switch 70 is open, corresponding to the block EPROM 24. However, if the switch 70 is closed, the microprocessor 20 will instead boot-up using the primary boot code residing in the bulk EPROM 62.

It can thereby be appreciated that if the contents of the bulk EPROM 60 are accidentally erased or otherwise corrupted, thereby affecting the primary boot code, the user flips the switch 70 and then reboots the system, so that the microprocessor 20 is rebooted using the primary boot code residing in the bulk EPROM 62. In this manner, either of the bulk EPROMs 60 and 62 can be used to boot the computer system. It is also noted that in the preferred embodiment, the same board can be used for both the system board S2 and the system board S2', as long as space is provided for mounting the switch 70, the XOR gate 72 and the resistors 66 and 68. Also, the bulk EPROM 60 would be the same size and have similar pin functions as the block EPROM 24 for direct replacement. This is desirable for ease of manufacturing.

Figure 5:
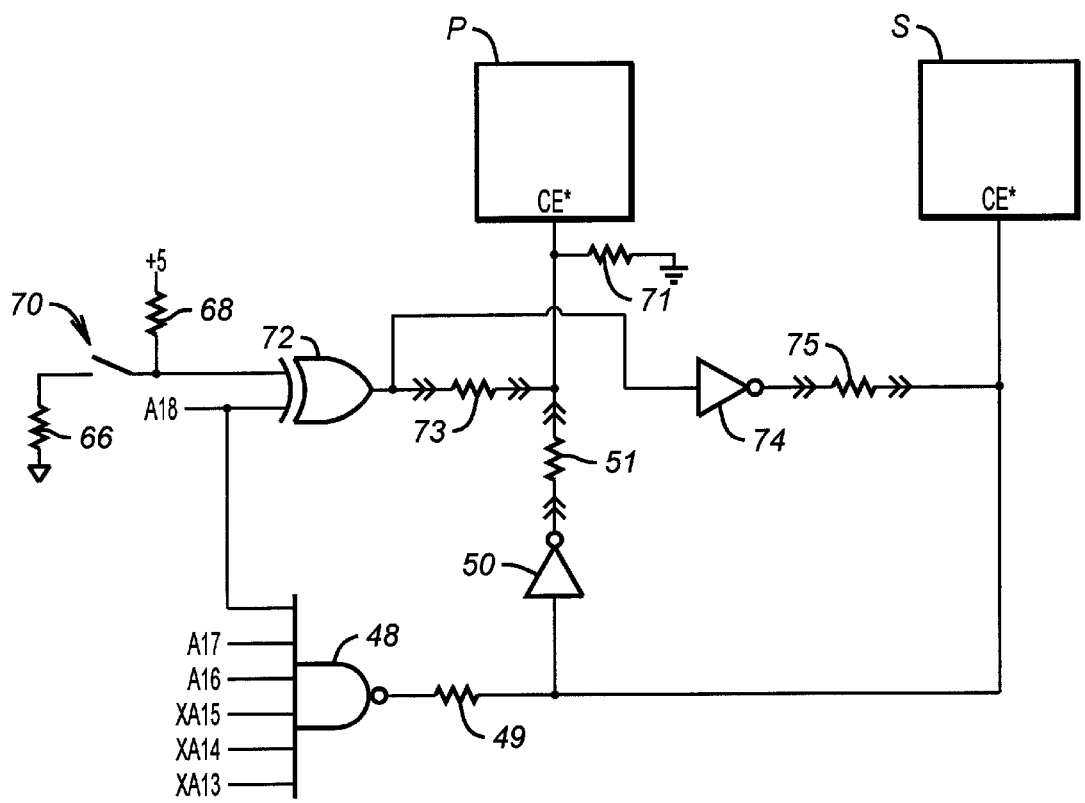
FIG. 5 is a schematic diagram according to the present invention which can be used to configure the system boards of FIGS. 1–4.

Referring now to FIG. 5, a schematic diagram according to the present invention is shown, which can be mounted on any of the system boards S1, S1', S2 and S2' to configure any one of the cases described above. The microprocessor 20, buffer system 21, the bus 22 and the address decode logic 23 are connected in the same manner as described above, but are not shown for purposes of clarity. A primary slot P is connected to the bus 22 and the address decode logic 23 as described previously, and is provided for receiving either the block EPROM 24, the bulk EPROM 40 or the bulk EPROM 60. A secondary slot S is also connected to the bus 22 and the address decode logic 23, and is provided for receiving either the OTP ROM 42, the bulk EPROM 32 or the bulk EPROM 62. The resistors 66 and 68, the switch 70, the XOR gate 72, the inverters 50 and 74 and the boot decode logic 48 are all shown and connected as previously described.

A resistor 71 is connected from the chip enable of primary slot P to ground. A resistor 73 is installed between the output of the XOR gate 72 and the chip enable of primary slot P. A resistor 51 is connected between the output of the inverter 50 and the chip enable of primary slot P. A resistor 75 is connected between the output of the inverter 74 and the chip enable of the secondary slot S. A resistor 49 is connected to the output of the NAND gate 48 and to the input of the inverter 50 and the chip enable of the secondary slot S. The resistors 49, 51, 71, 73 and 75 are preferably zero value resistors or wired jumpers installed at time of production for appropriate configuration of one of the system boards S1, S1', S2 or S2'. In the case of system board S1, the block EPROM 24 is installed into the primary slot P, whereas the secondary slot S remains empty. Additionally for system board S1, the resistor 71 is installed and the resistors 49, 51, 73 and 75, the inverters 50 and 70, the XOR gate 72 and the NAND gate 48 are not installed.

To configure the boards S2 or S2', the resistors 73 and 75 are installed, whereas the resistors 51, 71 and 49 are not installed. For the system-board S2, the block EPROM 24 and the bulk EPROM 32 are installed into the primary slot P and the secondary slot S, respectively. In the case of the system board S2, the XOR gate 72 serves the same function as the inverter 50, and the switch 70 should remain open. The inverter 74 serves to invert the output of the XOR gate 72 to properly enable the EPROM installed in the slot S. Note that the boot decode logic 48 is not connected and thus has no effect in this case.

To configure the system board S1', the resistors 51 and 49 are installed and the resistors 71, 73 and 75 are not installed. Thus, the switch 70 and the XOR gate 72 are removed from the circuit. The bulk EPROM 40 is installed in the primary slot P and the OTP ROM 42 is installed in the secondary slot S. Operation is the same as that shown in FIG. 2.

The configuration shown in FIG. 5 allows easy configuration of any of the system boards S1, S1', S2 and S2' by insertion of the appropriate resistors. Of course, either the switch 70, the resistors 66 and 68, the XOR gate 72 and the inverter 74' or the NAND gate 48 and the inverter 50, might also not be installed depending upon the configuration desired, for purposes of convenience and reduced expense.

Referring now to FIG. 6A, a flowchart diagram is shown illustrating the operation of a software program or routine used to reprogram the bulk EPROMs 60 and 62 in case of failure, upgrades or any enhancements desired. As long as one copy of the primary boot code is valid, the microprocessor 20 can be properly booted and initialized. The software routine is preferably written onto a floppy diskette and executed by the microprocessor 20 to replace the contents of the bulk EPROMs 60 and 62 to reestablish the system. Operation begins at step 100 when the software routine is called, and operation proceeds to step 102 where the contents of a first ROM A are verified by comparing its contents with a copy of the code also residing on the software diskette. ROM A preferably corresponds to the bulk EPROM 60, and a ROM B corresponds to the bulk EPROM 62. Operation proceeds to step 104 where a flag referred to as OK is monitored to indicate whether the verification procedure of the bulk EPROM 60 performed in step 102 was successful or not. If successful, the contents of the bulk EPROM 60 are properly verified, operation proceeds to step 106 where a reprogram routine is called, to reprogram first ROM B and then ROM A. In general, the reprogram routine reprograms the contents of both ROMs A and B, as indicated by the arguments A and B, respectfully, and verifies whether the reprogramming procedures were successful. If successful, the flag OK is returned true, and if not successful, the flag OK is returned false. The reprogram routine will be fully described below.

From step 106, operation proceeds to step 108 where the OK flag is checked to determine if the reprogramming routine was successful. If so, operation proceeds to step 110, which indicates that the reprogram operation is successful. The user is preferably provided with a message indicating successful operation. Operation then ends at step 130. Referring back to step 108, if the OK flag returns false, indicating that the reprogramming routine was unsuccessful, operation proceeds to step 112 where the user is informed that an error has occurred. In this case, the computer system requires servicing by proper personnel, or the EPROMs 60 and 62 may need replacement. From step 112 operation ends at step 130.

Referring back to step 104, if the contents of ROM A are not verified, operation proceeds to step 114, which calls the same reprogram routine called in step 106. It is noted, however, that the arguments for the reprogram routine called in step 114 are reversed, so that ROM A is reprogrammed first. Operation then proceeds to step 108 from step 114. In this manner, if the contents of ROM A is determined to be good, then ROM B is reprogrammed first. Otherwise, ROM A is reprogrammed first since reprogramming must occur whether the contents of ROM B are good or not.

Referring now to FIG. 6B, a flow chart diagram is shown illustrating the operation of the reprogram routine. Operation begins at a step 140 where the arguments received from the call steps 106 or 114 are transformed to ROM X, ROM Y and the OK flag. Operation proceeds to step 142 where the reprogram routine reprograms ROM X. If the reprogram routine is called from step 106, then step 142 reprograms ROM B, and if the reprogram routine is called from step 114, then ROM A is reprogrammed in step 142. From step 142, operation proceeds to step 144 where a verification operation is executed in a similar manner as step 102, to determine whether the reprogramming of ROM X was successful. Operation then proceeds to step 146 to determine if the reprogramming procedure was successful. If not, operation proceeds to step 148 where the reprogram routine is exited and the OK flag is set false. It is noted that the main program illustrated in FIG. 6A resumes execution at step 108 upon return from the reprogram routine. Here, operation would then proceed to step 108 and then to step 112 indicating an error has occurred.

From step 146, if the reprogramming procedure performed in step 142 is successful as verified in step 144, operation proceeds to step 150 where ROM Y is reprogrammed by the software. Operation then proceeds to step 152 to verify the contents of ROM Y, and then to step 154 to determine whether the reprogramming process in step 150 was successful. If not, operation proceeds to step 156 to exit the reprogram routine and return to the main program, with the OK flag returned as false. Otherwise, the reprogram procedure is successful on ROM Y as determined in step 154. If so, operation proceeds to return step 158 from step 154 where the OK flag is returned true indicating successful reprogramming operation. In this case, operation would proceed to steps 108 and 110 indicating that reprogramming was successful.

While the above description has focused on boot block EPROMs and the primary boot code being the code to be protected, similar arrangements could be developed for more conventional block EPROMs by duplicating the block to be protected in both bulk EPROMs, as was done for the primary boot code in EPROMs 60 and 62.

It can now be appreciated that a computer system according to the present invention performs similar functions typically performed using a block EPROM or a boot block EPROM using bulk EPROMs instead. In one embodiment, a single block EPROM is replaced with a bulk EPROM and an OTP ROM, where the primary boot code or other code desired to be protected is stored in the OTP ROM to prevent erasure. Separate decode logic is used to access the primary boot code or protected code in the OTP ROM, thereby bypassing the bulk EPROM. The bulk EPROM is used to store secondary boot code or other code which can be updated.

In an alternative embodiment where the original system used a block EPROM and a bulk EPROM, the block EPROM is replaced with another bulk EPROM and the primary boot code or other code designed to be protected is copied into of both bulk EPROMS, preferably at mirrored locations. In this case, an external switch is provided to the user to switch between the bulk EPROMs for switching purposes. Once the system has been initialized through the primary boot code of either bulk EPROM, a software routine can be executed to reprogram the contents of both bulk EPROMs for program fixes, enhancements or upgrades. Thus, dependency upon block or boot block EPROMs is avoided and production can continue using alternative components.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system, comprising:

a bus;

a microprocessor for asserting cycles on said bus;

a system ROM coupled to said bus for storing boot code including primary boot code for execution by said microprocessor upon power up of the computer system, other boot code and other system code, said system ROM comprising:

a flash EPROM coupled to said bus and having an enable input, said flash EPROM for storing said other boot code and said other system code; and a ROM coupled to said bus and having an enable input, said ROM for storing said primary boot code; and a selector coupled to said microprocessor, said system ROM and said bus, said selector providing a first signal at an enabling value to said enable input of said ROM and a second signal at a disabling value to said enable input of said flash EPROM when a cycle is executed to said primary boot code and said selector providing a disabling value on said first signal and an enabling value on said second signal when a cycle is executed to said other boot code or said other system code.

2. The computer system of claim 1, wherein said ROM is a one time programmable ROM.

3. The computer system of claim 1, further including circuitry adapted to erase and reprogram said flash EPROM.

4. A circuit for use in a computer system, the computer system including a microprocessor asserting bus cycles, the circuit comprising:

a bus for carrying the microprocessor bus cycles;

first and second sockets coupled to said bus for receiving devices defining a system ROM for storing boot code including primary boot code for execution by the microprocessor upon power up of the computer system, other boot code and other system code, each socket having a chip enable contact, said system ROM consisting of:

a first block EPROM having an enable input, said first block EPROM for storing said primary boot code, said other boot code and said other system code, said first block EPROM for installation in said first socket with said enable input for connection to said chip enable contact of said first socket and wherein said second socket is empty; or a first bulk flash EPROM having an enable input, said first bulk flash EPROM for storing said other boot code and said other system code, and a non-electrically erasable ROM having an enable input, said ROM for storing said primary boot code, said first bulk flash EPROM for installation in said first socket with said enable input for connection to said chip enable contact of said first socket and said ROM for installation in said second socket with said enable input for connection to said chip enable contact of said second socket; or a second block EPROM having an enable input, said second block EPROM for storing said primary boot code, said other boot code and said other system code, and a second bulk flash EPROM having an enable input, said second bulk flash EPROM for storing a copy of said other system code, said second block EPROM for installation in said first socket with said enable input for connection to said chip enable contact of said first socket and said second bulk flash EPROM for installation in said second socket with said enable input for connection to said chip enable contact of said second socket; or a third bulk flash EPROM having an enable input, said third bulk flash EPROM for storing said primary boot code, said other boot code and said other system code, and a fourth bulk flash EPROM having an enable input, said fourth bulk flash EPROM for storing said primary boot code and a copy of said other system code, said third bulk flash EPROM for installation in said first socket with said enable input for connection to said chip enable contact of said first socket and said fourth bulk flash EPROM for installation in said second socket with said enable input for connection to said chip enable contact of said second socket;

a first selector coupled to said bus and to said first socket chip enable contact, said first selector adapted to indicate selection of the device in said first socket;

a second selector coupled to said bus and to said second socket chip enable contact, said second selector adapted to indicate selection of the device in said second socket when said system ROM is accessed but selection of the device in said first socket is not indicated by said first selector;

a third selector coupled to said bus and to said first socket chip enable contact, said third selector adapted to indicate selection of the device in said first socket when said primary boot code is not accessed;

a fourth selector coupled to said bus and to said second socket chip enable contact, said fourth selector adapted to indicate selection of the device in said second socket when said primary boot code is accessed;

a first circuit adapted to connect said chip enable contact of said first socket to a proper enabling level when said system ROM is said first block EPROM and adapted to disconnect said first selector to said first socket chip enable contact when said system ROM is said first block EPROM and adapted to not connect said third selector to said first socket chip enable contact when said system ROM is said first block EPROM;

a second circuit adapted to connect said first selector to said first socket chip enable contact when said system ROM is either said second block EPROM and said second bulk flash EPROM or said third and fourth bulk flash EPROMs and adapted to not connect said first selector to said first socket chip enable contact when said system ROM is either said first block EPROM or said first bulk flash EPROM and said ROM;

a third circuit adapted to connect said second selector to said second socket chip enable contact when said system ROM is either said second block EPROM and said second bulk flash EPROM or said third and fourth bulk flash EPROMs and said second selector to said second socket chip enable contact when said system ROM is either said first block EPROM or said first bulk flash EPROM and said ROM;

a fourth circuit adapted to connect said third selector to said first socket chip enable contact when said system ROM is said first bulk flash EPROM and said ROM and adapted to not connect said third selector to said first socket chip enable contact when said system ROM is either said first block EPROM, said second block EPROM and said second bulk flash EPROM or said third and fourth bulk flash EPROMs; and a fifth circuit adapted to connect said fourth selector to said second socket chip enable contact when said system ROM is said first bulk flash EPROM and said ROM and adapted to not connect said fourth selector to said second socket chip enable contact when said system ROM is either said first block EPROM, said second block EPROM and said second bulk flash EPROM or said third and fourth bulk flash EPROMs.

5. A computer system, comprising:

a bus;

a microprocessor for asserting cycles on said bus;

a keyboard coupled to said bus and said microprocessor, said keyboard being initialized by keyboard initialization code executed by said microprocessor;

a system ROM coupled to said bus for storing boot code including primary boot code for execution by said microprocessor upon power up of the computer system, said primary boot code including the keyboard initialization codes, other boot code and other system code, said system ROM comprising:
- a flash EPROM coupled to said bus and having an enable input, said flash EPROM for storing said other boot code and said other system code; and
- a ROM coupled to said bus and having an enable input, said ROM for storing said primary boot code; and a selector coupled to said microprocessor, said system ROM and said bus, said selector providing a first signal at an enabling value to said enable input of said ROM and a second signal at a disabling value to said enable input of said flash EPROM when a cycle is executed to said primary boot code and said selector providing a disabling value on said first signal and an enabling value on said second signal when a cycle is executed to said other boot code or said other system code.

6. The computer system of claim 5, wherein said ROM is a one time programmable ROM.

7. The computer system of claim 5, further including circuitry adapted to erase and reprogram said flash EPROM.

8. A circuit for use in a computer system, the computer system including a microprocessor asserting bus cycles, the circuit comprising:
- a bus for carrying the microprocessor bus cycles;
- a keyboard coupled to said bus, said keyboard being initialized by keyboard initialization code, for execution by said microprocessor;
- first and second sockets coupled to said bus for receiving devices defining a system ROM for storing boot code including primary boot code for execution by the microprocessor upon power up of the computer system, said primary boot code including the keyboard initialization code, other boot code and other system code, each socket having a chip enable contact, said system ROM consisting of:
  - a first block EPROM having an enable input, said first block EPROM for storing said primary boot code, said other boot code and said other system code, said first block EPROM for installation in said first socket with said enable input for connection to said chip enable contact of said first socket and wherein said second socket is empty; or
  - a first bulk flash EPROM having an enable input, said first bulk flash EPROM for storing said other boot code and said other system code, and a non-electrically erasable ROM having an enable input, said ROM for storing said primary boot code, said first bulk flash EPROM for installation in said first socket with said enable input for connection to said chip enable contact of said first socket and said ROM for installation in said second socket with said enable input for connection to said chip enable contact of said second socket; or
  - a second block EPROM having an enable input, said second block EPROM for storing said primary boot code, said other boot code and said other system code, and a second bulk flash EPROM having an enable input, said second bulk flash EPROM for storing a copy of said other system code, said second block EPROM for installation in said first socket with said enable input for connection to said chip enable contact of said first socket and said second bulk flash EPROM for installation in said second socket with said enable input for connection to said chip enable contact of said second socket; or
  - a third bulk flash EPROM having an enable input, said third bulk flash EPROM for storing said primary boot code, said other boot code and said other system code, and a fourth bulk flash EPROM having an enable input, said fourth bulk flash EPROM for storing said primary boot code and a copy of said other system code, said third bulk flash EPROM for installation in said first socket with said enable input for connection to said chip enable contact of said first socket and said fourth bulk flash EPROM for installation in said second socket with said enable input for connection to said chip enable contact of said second socket;
- a first selector coupled to said bus and to said first socket chip enable contact, said first selector adapted to indicate selection of the device in said first socket;
- a second selector coupled to said bus and to said second socket chip enable contact, said second selector adapted to indicate selection of the device in said second socket when said system ROM is accessed but selection of the device in said first socket is not indicated by said first selector;
- a third selector coupled to said bus and to said first socket chip enable contact, said third selector adapted to indicate selection of the device in said first socket when said primary boot code is not accessed;
- a fourth selector coupled to said bus and to said second socket chip enable contact, said fourth selector adapted to indicate selection of the device in said second socket when said primary boot code is accessed;
- a first circuit adapted to connect said chip enable contact of said first socket to a proper enabling level when said system ROM is said first block EPROM and adapted to disconnect said first selector to said first socket chip enable contact when said system ROM is said first block EPROM and adapted to not connect said third selector to said first socket chip enable contact when said system ROM is said first block EPROM;
- a second circuit adapted to connect said first selector to said first socket chip enable contact when said system ROM is either said second block EPROM and said second bulk flash EPROM or said third and fourth bulk flash EPROMs and adapted to not connect said first selector to said first socket chip enable contact when said system ROM is either said first block EPROM or said first bulk flash EPROM and said ROM;
- a third circuit adapted to connect said second selector to said second socket chip enable contact when said system ROM is either said second block EPROM and said second bulk flash EPROM or said third and fourth bulk flash EPROMs and said second selector to said second socket chip enable contact when said system ROM is either said first block EPROM or said first bulk flash EPROM and said ROM;
- a fourth circuit adapted to connect said third selector to said first socket chip enable contact when said system ROM is said first bulk flash EPROM and said ROM and adapted to not connect said third selector to said first socket chip enable contact when said system ROM is either said first block EPROM, said second block EPROM and said second bulk flash EPROM or said third and fourth bulk flash EPROMs; and
- a fifth circuit adapted to connect said fourth selector to said second socket chip enable contact when said system ROM is said first bulk flash EPROM and said ROM and adapted to not connect said fourth selector to said second socket chip enable contact when said system ROM is either said first block EPROM, said second block EPROM and said second bulk flash EPROM or said third and fourth bulk flash EPROMs.

* * * * *